(12) United States Patent
Whitehead et al.

(10) Patent No.: US 6,452,734 B1
(45) Date of Patent: Sep. 17, 2002

(54) COMPOSITE ELECTROPHORETICALLY-SWITCHABLE RETRO-REFLECTIVE IMAGE DISPLAY

(75) Inventors: Lorne A. Whitehead; Michele Ann Mossman, both of Vancouver (CA)

(73) Assignee: The University of British Columbia, Vancouver (CA)

(*) Notice: Subject to any disclaimer, the term of this patent is extended or adjusted under 35 U.S.C. 154(b) by 0 days.

(21) Appl. No.: 09/996,987

(22) Filed: Nov. 30, 2001

(51) Int. Cl.⁷ ................................................ G02B 5/04
(52) U.S. Cl. ........................ 359/836; 359/837; 359/833; 359/834
(58) Field of Search ................................ 359/836, 837, 359/833, 834, 296, 228, 222, 263, 618, 619, 621, 291

(56) References Cited

U.S. PATENT DOCUMENTS

| | | |
|---|---|---|
| 3,291,554 A | 12/1966 | Price |
| 3,556,638 A | 1/1971 | Banks et al. |
| 3,571,511 A | 3/1971 | Myer |
| 3,612,653 A | 10/1971 | Rajchman |
| 3,698,793 A | 10/1972 | Tellerman |
| 3,730,608 A | 5/1973 | Castegnier |
| 3,746,785 A | 7/1973 | Goodrich |
| 3,796,480 A | 3/1974 | Preston, Jr. et al. |
| 3,987,668 A | 10/1976 | Popenoe |
| 4,113,360 A | 9/1978 | Baur et al. |
| 4,135,960 A | 1/1979 | Shuppert et al. |
| 4,148,563 A | 4/1979 | Herbert |
| 4,156,745 A | 5/1979 | Hatzakis et al. |
| 4,165,155 A | 8/1979 | Gordon, II et al. |
| 4,218,302 A | 8/1980 | Dalisa et al. |
| 4,249,814 A | 2/1981 | Hull et al. |
| 4,324,456 A | 4/1982 | Dalisa |
| 4,391,490 A | 7/1983 | Hartke |
| 4,420,897 A | 12/1983 | Castleberry |
| 4,448,622 A | 5/1984 | Duchane et al. |
| 4,536,061 A | 8/1985 | Nishimura |
| 4,617,608 A | 10/1986 | Blonder et al. |
| 4,714,326 A | 12/1987 | Usui et al. |
| 4,723,834 A | 2/1988 | Van de Venne et al. |

(List continued on next page.)

FOREIGN PATENT DOCUMENTS

| | | |
|---|---|---|
| DE | 3720861 A | 3/1989 |
| DE | 4343808 A1 | 6/1995 |
| EP | 0023741 A1 | 2/1981 |
| EP | 204427 A | 12/1986 |
| EP | 728799 A1 | 8/1996 |
| EP | 797127 A | 9/1997 |

(List continued on next page.)

OTHER PUBLICATIONS

"Subdivided Electrophoretic Display", Harbour et al, Xerox Disclosure Journal, vol. 4, No. 6, Nov. 1979, p. 705.

(List continued on next page.)

*Primary Examiner*—Mohammad Sikder
(74) *Attorney, Agent, or Firm*—Oyen Wiggs Green & Mutala

(57) ABSTRACT

A light deflector/recombiner is longitudinally symmetrical with respect to an X axis perpendicular to a Z axis. An X and Z vector components inverter longitudinally symmetrical with respect to both the X axis and a Y axis perpendicular to the X and Z axes lies parallel to the deflector/recombiner. A Y vector component inverter longitudinally symmetrical with respect to the X axis lies parallel to and between the deflector/recombiner and the X and Z inverter. The Y inverter has many reflector elements. Light rays incident in the Z direction encounter an element only once during return passage between the deflector/recombiner and the X and Z inverter. The X and Z inverter directionally inverts the rays with respect to the X and Z axes and the reflector element directionally inverts them with respect to the Y axis, such that substantially all incident rays are retro-reflected with respect to the X, Y and Z axes.

22 Claims, 6 Drawing Sheets

U.S. PATENT DOCUMENTS

| | | |
|---|---|---|
| 4,867,515 A | 9/1989 | Normandin |
| 4,895,428 A | 1/1990 | Nelson et al. |
| 5,045,847 A | 9/1991 | Tarui et al. |
| 5,099,343 A | 3/1992 | Margerum et al. |
| 5,128,782 A | 7/1992 | Wood |
| 5,147,519 A | 9/1992 | Legge |
| 5,221,987 A | 6/1993 | Laughlin |
| 5,235,463 A | 8/1993 | Broussoux et al. |
| 5,283,148 A | 2/1994 | Rao |
| 5,301,009 A | 4/1994 | Shurtz, II |
| 5,317,667 A | 5/1994 | Weber et al. |
| 5,319,491 A | 6/1994 | Selbrede |
| 5,396,350 A | 3/1995 | Beeson et al. |
| 5,397,669 A | 3/1995 | Rao |
| 5,425,710 A | 6/1995 | Khair et al. |
| 5,455,709 A | 10/1995 | Dula, III et al. |
| 5,504,618 A | 4/1996 | Hirs et al. |
| 5,530,053 A | 6/1996 | Rao et al. |
| 5,530,067 A | 6/1996 | Rao et al. |
| 5,555,327 A | 9/1996 | Laughlin |
| 5,555,558 A | 9/1996 | Laughlin |
| 5,561,541 A | 10/1996 | Sharp et al. |
| 5,566,260 A | 10/1996 | Laughlin |
| 5,598,280 A | 1/1997 | Nishio et al. |
| 5,608,837 A | 3/1997 | Tai et al. |
| 5,731,900 A | 3/1998 | Milner |
| 5,745,632 A | 4/1998 | Dreyer |
| 5,841,916 A | 11/1998 | Laughlin |
| 5,880,886 A | 3/1999 | Milner |
| 5,959,777 A | 9/1999 | Whitehead |
| 5,999,307 A | 12/1999 | Whitehead |
| 6,064,784 A | 5/2000 | Whitehead et al. |
| 6,088,013 A | 7/2000 | Montour et al. |
| 6,215,920 B1 | 4/2001 | Whitehead et al. |
| 6,304,365 B1 | 10/2001 | Whitehead |

FOREIGN PATENT DOCUMENTS

| | | |
|---|---|---|
| EP | 0807832 A2 | 11/1997 |
| GB | 2265024 A | 9/1993 |
| JP | 54057576 | 5/1979 |
| JP | 55-525 | 1/1980 |
| JP | 59078816 | 5/1984 |
| JP | 60038130 | 2/1985 |
| JP | 60-185918 | 9/1985 |
| JP | 2-254405 | 10/1990 |
| JP | 5-281481 | 10/1993 |
| WO | WO 95/31738 | 11/1995 |
| WO | WO 97/31276 | 8/1997 |
| WO | WO 99/12069 | 3/1999 |
| WO | WO 99/15595 | 4/1999 |
| WO | WO 99/28890 | 6/1999 |
| WO | WO 00/17477 | 3/2000 |
| WO | WO 01/37627 | 5/2001 |

OTHER PUBLICATIONS

"Simplified Ray Tracing in Cylindrical Systems", L.A. Whitehead, Applied Optics, vol. 21, No. 19, pp. 3536–3538, Oct. 1, 1982.

"Surface Property Changes Induced in Poly(1–Hexene) Elastomer By High Energy Ion Irradition", Carlson et al, Proc. 4th Intl. Conf. on Ion Bean Modification of Materials, Ithaca, NY, Jul. 16–20, 1987 pp. 507–512.

"Evhanescent–wave scattering by electrophoretic microparticles: a mechanism for optical switching", Remillard et al, Applied Optics, vol. 34, No. 19, Jul. 1, 1995, pp. 3777–3785.

"Patented fiber switch revs speed, cuts cost", George Kotelly, in "Lightwave", Oct., 1995 web site publication on PennWell Publishing Co., Tulsa, OK.

"Colloidal Refractometry: Meaning and Measurement of Refractive Index for Dispersions; The Science That Time Forgot", M. Mohammadi, Advances in Colloid and Interface Science 62 (1995) 17–29.

"Elastomeric Light Valves", Qin et al, Advanced Materials 1997, 9, No. 5, pp. 407–410.

3M Fluorinert$^{TM}$ Electronic Liquid brochure, http:/www.3m.com/fluids/florinrt.html, Sep., 1998.

Neufeldt, Victoria. Webster's New World Dictionary of American English, 3rd College Edition. Webster's New World, New York, New York, p. 857. Dec. 31, 1998.

"New Refractive Display Based on Total Internal Reflection In Prismatic Microstructures", Michele A. Mossman et al, Intl. Display Research Conference of the Society for Information Display, Sep., 2000.

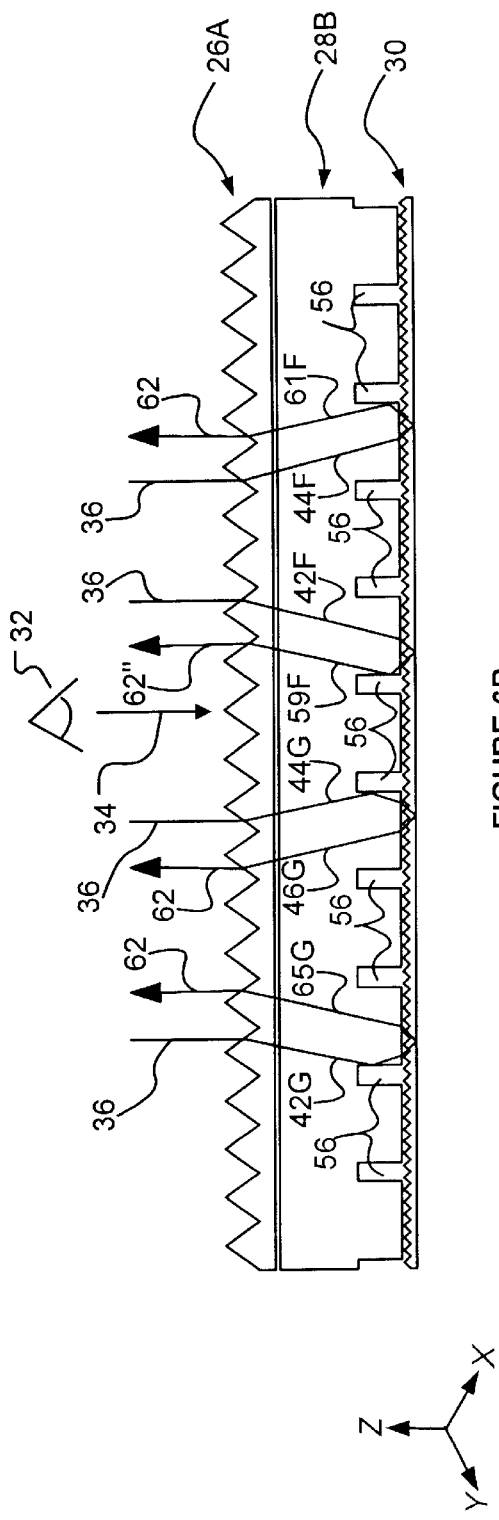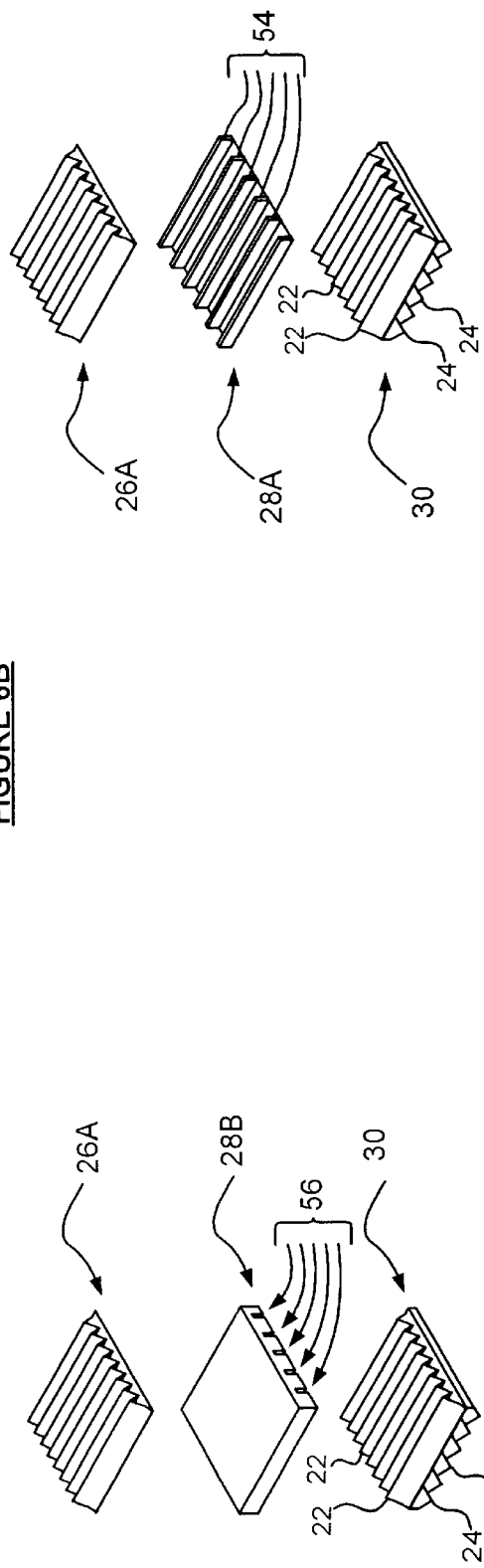

COMPOSITE ELECTROPHORETICALLY-SWITCHABLE RETRO-REFLECTIVE IMAGE DISPLAY

TECHNICAL FIELD

This invention provides an electrophoretically switchable reflective image display which retro-reflects incident light rays with respect to three mutually perpendicular axes.

BACKGROUND

U.S. Pat. No. 6,304,365 (the '365 patent), which is incorporated herein by reference, describes a reflective (front-lit) image display for viewing images in a preferred direction. The display has parallel, macroscopically planar, structured surface (preferably prismatic), light deflecting and reflecting portions which are longitudinally symmetrical in mutually perpendicular directions, both of which are perpendicular to the preferred viewing direction. A liquid electro-phoretic medium containing a particulate suspension contacts the light reflecting portion. A controller applies an electromagnetic force to selectively electrophoretically move the particles into the evanescent wave region adjacent the light reflecting portion to frustrate total internal reflection (TIR) of light rays at selected points on the light reflecting portion.

The structured surfaces on the light deflecting portion deflect light rays incident in the preferred viewing direction toward the light reflecting portion by imparting to the rays a directional component in the direction of longitudinal symmetry of the light reflecting portion. The structured surfaces on the light reflecting portion totally internally reflect the deflected light rays toward the light deflecting portion at points other than the selected points at which TIR is frustrated. Then, the structured surfaces on the light deflecting portion again deflect the totally internally reflected light rays, cancelling the directional component therefrom, such that the deflected totally internally reflected light rays emerge from the display in a direction substantially parallel to the preferred viewing direction.

The directional characteristic of any light ray can be described in terms of three vectors corresponding to three mutually perpendicular axes. For a light ray to undergo "full retro-reflection", all three vectors must undergo a directional inversion. An odd number of reflections from a planar reflector oriented perpendicular to a given axis directionally inverts (i.e. reverses the sign of) the component of the ray's direction vector for that axis. Full retro-reflection requires an odd number of reflections in each one of the three mutually perpendicular directions.

FIGS. 1A and 2 pictorially illustrate two optical geometries disclosed in the '365 patent. In FIG. 1A, outward and inward thin sheets 10, 12 are separated by fluidic gap 14. Prisms 16 are formed on the inward surface of outward sheet 10, which has a flat outward surface. Prisms 18 are formed on the inward surface of inward sheet 12, which also has a flat outward surface. Prisms 16, 18 extend longitudinally in mutually perpendicular directions: prisms 16 extending substantially parallel to the X axis, and prisms 18 extending substantially parallel to the Y axis. The preferred Z axis viewing direction is mutually perpendicular to both the X and Y axes. A low refractive index medium (not shown) is maintained in gap 14 to reduce the extent to which light rays entering inward sheet 12 are refracted, thus maintaining a high effective refractive index for inward sheet 12. In the FIG. 2 geometry, sheet 20 is formed with mutually perpendicular, longitudinally extending outward prisms 22 and inward prisms 24 on opposite sides of a single sheet 20; prisms 22 extending substantially parallel to the X axis, and prisms 24 extending substantially parallel to the Y axis. An electrophoresis medium (not shown) is maintained in contact with inward prisms 24.

The FIG. 1A geometry is better suited to use by viewer 32 with light rays which are incident in the Z axis direction 34A perpendicular to the flat outward surface of outward sheet 10. Both the X axis vector component and the Z axis vector component of a light ray incident on the FIG. 1A geometry are directionally inverted, but the incident ray's Y axis vector component is not inverted. The FIG. 1A geometry inverts the vector components of incident light rays in two of the three mutually perpendicular X, Y and Z directions, namely the X and Z directions; without inverting the vector component in the third (Y axis) direction. FIG. 1B depicts inversion of the X and Z components of light rays incident on sheet 12, viewed in cross-section along the Y axis. FIG. 1C depicts inversion of the Z component, but not the Y component, of a light ray incident on sheet 12, viewed in cross-section along the X axis.

In applications such as variable retro-reflectivity image displays, directional inversion of X, Y and Z components is desirable, rendering the FIG. 1A geometry inadequate for such applications. Highly retro-reflective sheets consisting of glass beads or corner-cube structures are currently in widespread use as retro-reflective signs. In the latter case, reflection is caused by TIR in the cube structures, but it is impractical to modulate TIR in such sheets to produce a variable retro-reflectivity image display. For example, it is impractical to fabricate such sheets using materials of sufficiently high refractive index for TIR to occur when the material contacts a suitable electrophoretic medium.

The FIG. 2 geometry, which similarly inverts the X and Z components without inverting the Y component, is better suited to use by viewer 32 with light rays which are incident in direction 34B inclined at 45° to the macroscopic plane of sheet 20. Electrophoretically switchable image displays incorporating FIG. 2 type geometric structures are easily fabricated, work well within a reasonably wide angular range of incident light, and are amenable to achieving full retro-reflection in the X, Y and Z directions in accordance with this invention.

SUMMARY OF INVENTION

The invention provides a three sheet reflective variable image display for retro-reflecting light with respect to mutually perpendicular X, Y and Z axes. The display has a preferred Z axis viewing direction. The first (outermost) sheet is a light deflecting/recombining transmitter sheet which is longitudinally symmetrical with respect to the X axis. The second (innermost) sheet is an X and Z vector components inverting reflector sheet with light deflecting and light reflecting portions. The light deflecting portion is longitudinally symmetrical with respect to the X axis. The light reflecting portion is longitudinally symmetrical with respect to the Y axis. The X and Z vector components inverter sheet is substantially macroscopically parallel to the light deflecting/recombining transmitter sheet. The third (intermediate) sheet is a Y vector component inverting transmitter sheet having longitudinal symmetry with respect to the X axis. The Y vector component inverter is substantially macroscopically parallel to and positioned between the light deflecting/recombining transmitter sheet and the X and Z vector components inverter sheet. The Y vector component inverter has a plurality of microstructure reflector elements with their surface normal substantially parallel to the Y axis. Each element has a height H. Adjacent pairs of elements are spaced apart by a separation distance D.

Light rays within about 25° of perpendicular incidence to the light deflecting/recombining transmitter (hereafter called "approximately perpendicular" light rays) are transmitted by the light deflecting/recombining transmitter toward the Y vector component inverter and X and Z vector components inverter at an angle θ of about 30° to 60° with respect to the Z axis. The rays are reflected by the X and Z vector components inverter toward the Y vector component inverter and light deflecting/recombining transmitter at the same angle θ with respect to the Z axis. The vector components of substantially all of the light rays reflected by the X and Z vector components inverter are directionally inverted with respect to the X and Z axes. The vector components of substantially all of the light rays transmitted by the light deflecting/recombining transmitter and reflected by the X and Z vector components inverter are directionally inverted with respect to the Y axis by making only one reflection at one of the Y vector component inverter's reflector elements before the rays return to the light deflecting/recombining transmitter. The rays return to the light deflecting/recombining transmitter at the same angle θ with respect to the Z axis at which they were initially transmitted by the light deflecting/recombining transmitter. The returned rays are then transmitted by the light deflecting/recombining transmitter sheet toward the viewer within an angular range of about 25° of perpendicular to the light deflecting/recombining transmitter, with the angle of each returned ray substantially 180° opposed to that of the corresponding incident light ray. That is, a light ray incident on the light deflecting/recombining transmitter at an angle α with respect to the Z axis, where α<25°, returns to the viewer at substantially the same angle α, but travels in the opposite direction to the incident ray.

The reflector elements' H:D aspect ratio is selected to maximize the fraction of light rays which encounter a reflector element only once during the rays' return passage between the light deflecting/recombining transmitter and X and Z vector components inverter. The desired Y-axis vector component net directional inversion is not imparted to light rays that do not encounter a reflector element, nor to light rays that encounter a reflector element twice.

BRIEF DESCRIPTION OF DRAWINGS

FIGS. 6A and 6B are respectively exploded pictorial and cross-sectional illustrations, on a greatly enlarged scale, of an electro-phoretically switchable fully retro-reflective display having a channeled Y vector component inverter in accordance with the invention.

FIG. 6C is an exploded pictorial illustration, on a greatly enlarged scale, of an electrophoretically switchable fully retro-reflective display having a ribbed Y vector component inverter in accordance with the invention.

DESCRIPTION

Figure 1A:
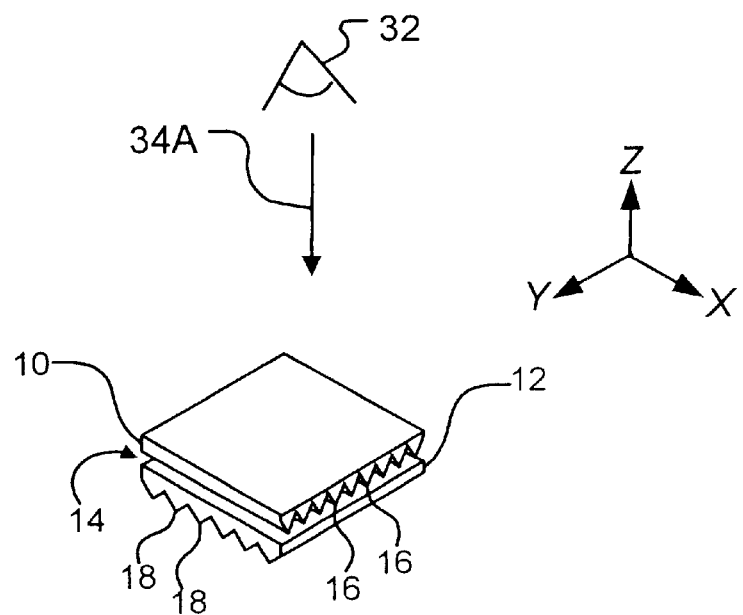
FIG. 1A pictorially illustrates, on a greatly enlarged scale, a first prior art optical geometry for an electrophoretically switchable X and Z vector components inverting reflector sheet.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

To assist persons skilled in the art in comprehending the invention, it is useful to review the reflective nature of thin, flat optical sheets. Although an optical sheet may contain structures that are not perfectly flat, the size scale of such structures is sufficiently small that the sheet as a whole can be considered to be macroscopically planar. The orientation of such planar optical sheets is described herein in terms of three mutually perpendicular X, Y and Z axes. In particular, the optical sheets are oriented with their macroscopic surface normals parallel to the Z axis. As will be explained, such planar optical sheets can be used either as "light deflecting/recombining transmitter" sheets, as "vector component inverting reflector" sheets or as "vector component inverting transmitter" sheets. Individual light rays are characterized herein in terms of their X, Y and Z vector components.

Light deflecting/recombining transmitter sheets, depending on their particular optical properties, can be used to deflect light rays by imparting a selected directional component to the rays, or to recombine light rays by cancelling a previously imparted directional component therefrom. Vector component inverting reflector sheets and vector component inverting transmitter sheets, depending on their particular optical properties, can be used to invert (i.e. reverse the sign of) light rays' X, Y and/or Z vector components. Specifically, depending on their particular light reflecting characteristics, vector component inverting sheets invert the direction of one or more of the X, Y and Z vector components. A vector component inverting sheet capable of inverting all three of a light ray's X, Y and Z vector components achieves full retro-reflection. Four types of vector component inverting sheets are of interest with respect to this invention; namely, Z component inverters; X and Z components inverters; X, Y and Z components inverters; and, Y component inverters.

A Z component inverter inverts the Z vector component of an incident light ray. Since a Z component inverter is an optical sheet oriented with its macroscopic surface normal parallel to the Z axis, it is apparent that a Z component inverter inverts the vector component which is parallel to the sheet's macroscopic surface normal. For example, a conventional mirror reflector sheet oriented with the sheet's macroscopic surface normal parallel to the Z axis and, consequently, with the plane of the mirror parallel to the plane defined by the X and Y axes, will invert the Z component of an incident light ray.

An X and Z components inverter inverts both the X and Z vector components of an incident light ray, without inverting the light ray's Y vector component. For example, a macroscopically planar sheet bearing a large plurality of very small longitudinally symmetric prisms, oriented with the sheet's macroscopic surface normal parallel to the Z axis and with the prisms extending parallel to the Y axis, will invert the X and Z vector components of an incident light ray without inverting the light ray's Y vector component.

An X, Y and Z components inverter achieves full retro-reflection by inverting all three of an incident light ray's X, Y and Z vector components. For example, a macroscopically planar sheet bearing a large plurality of very small corner-cube reflector elements, oriented with the sheet's normal parallel to Z axis, will invert all three of an incident light ray's X, Y and Z vector components. Such "retro-reflector" sheets are well known.

A Y component inverter inverts the Y vector component of an incident light ray, without inverting either of the light ray's X or Z vector components. For example, a macroscopically planar sheet bearing a large plurality of very small, parallel mirror elements oriented with the sheet's macroscopic surface normal parallel to the Z axis and with each mirror element's surface normal parallel to the Y axis, will invert the Y vector component of an incident light ray, without inverting either of the light ray's X or Z vector components.

This invention combines a light deflecting/recombining transmitter sheet, a Y vector component inverting transmitter sheet, and a X and Z vector components inverting reflector sheet to form a retro-reflector, namely a net X, Y and Z vector components inverting reflector. More particularly, as shown schematically in FIGS. 3A and 3B, the invention provides a composite display structure incorporating three planar microstructured optical sheets, namely light deflecting/recombining transmitter sheet 26, Y vector component inverting transmitter sheet 28 and electrophoretically switchable X and Z vector components inverting reflector sheet 30.

Figure 2:
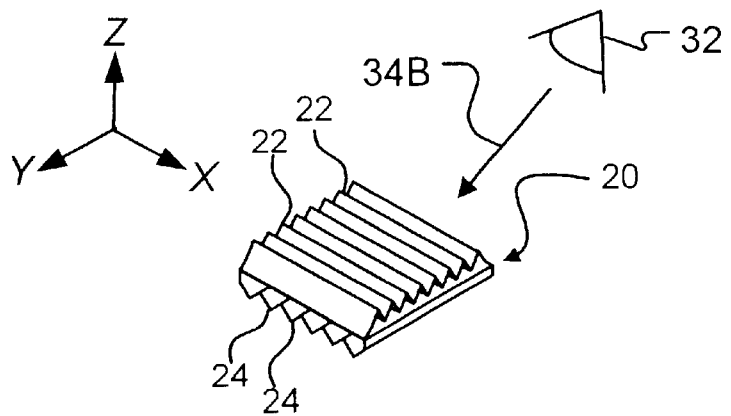
FIG. 2 pictorially illustrates, on a greatly enlarged scale, a second prior art optical geometry for an electrophoretically switchable X and Z vector components inverting reflector sheet.
Figure 1B:
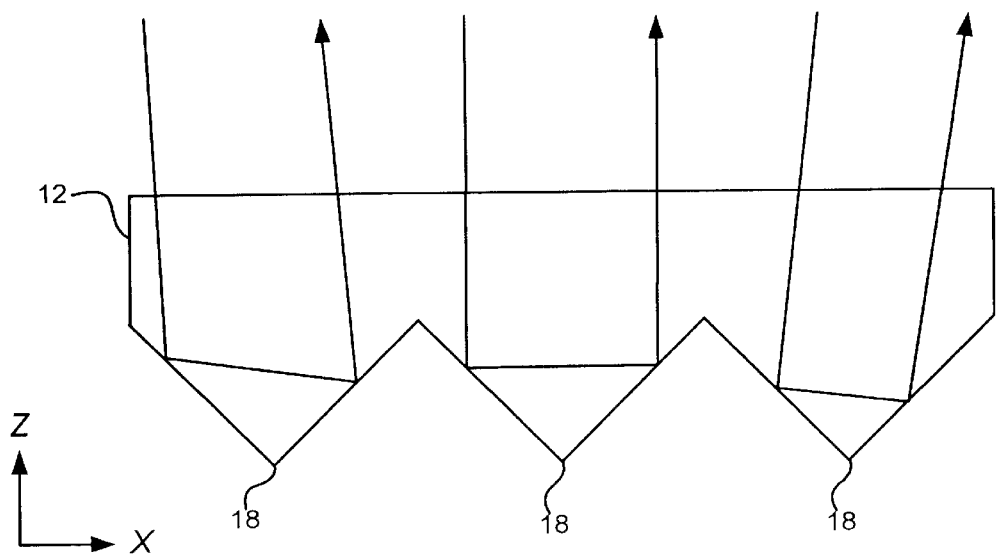
FIG. 1B depicts the lower half of the FIG. 1A geometry in enlarged cross-section, viewed along the Y axis, and shows the X and Z vector components inverting characteristic.
Figure 1C:
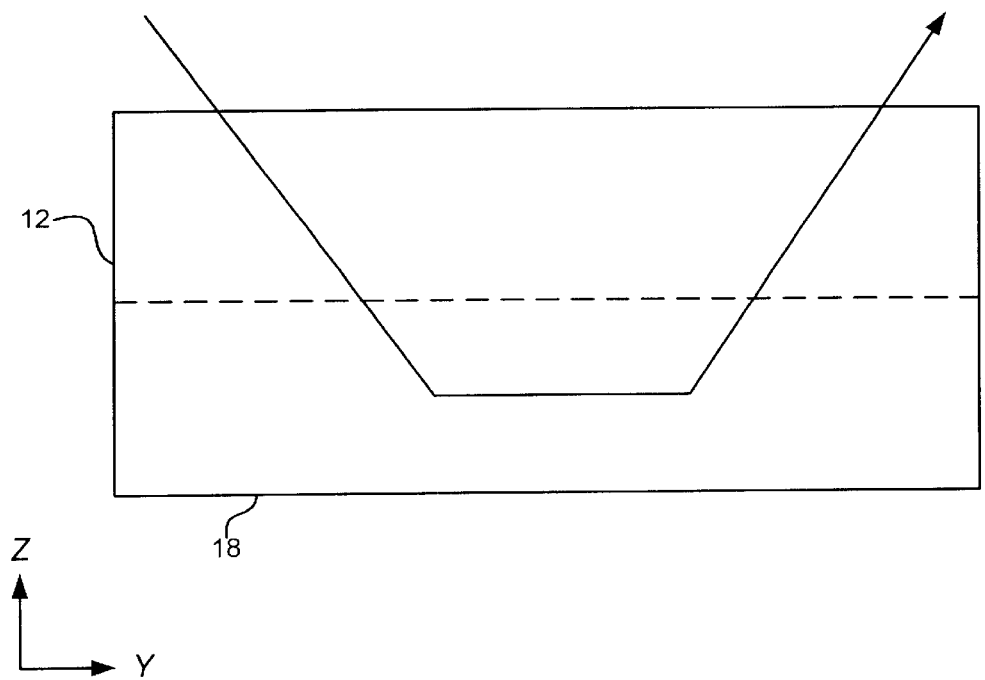
FIG. 1C depicts the lower half of the FIG. 1A geometry in enlarged cross-section, viewed along the X axis, and shows the absence of any Y vector component inversion.

The inward-most portion of the structure (that is, the portion farthest from viewer 32, who views the display in an approximately perpendicular incidence direction 34 parallel to the Z axis) is electrophoretically switchable X and Z vector components inverter 30, which has the optical geometry shown in FIG. 2, and is described in the '365 patent. X and Z vector components inverter 30 can be formed of a sheet material such as polycarbonate (refractive index $\eta \approx 1.59$), although better performance is obtained with a higher refractive index material. As explained above, X and Z vector components inverter 30 directionally inverts incident light rays with respect to the mutually perpendicular X and Z axes shown in FIG. 3B. A third, Y axis is perpendicular to both of the X and Z axes. X and Z vector components inverter 30 does not directionally affect the incident ray's Y axis vector component.

Light deflecting/recombining transmitter sheet 26 is the outermost portion of the structure (i.e. closest to viewer 32). Light rays 36 approximately perpendicularly incident on sheet 26's outward surface 38 are transmitted through inward surface 40 toward Y vector component inverter 28 as rays 42, 44 which have been refracted (or reflected), ideally at 45°, relative to normal viewing direction 34.

Figure 4A:
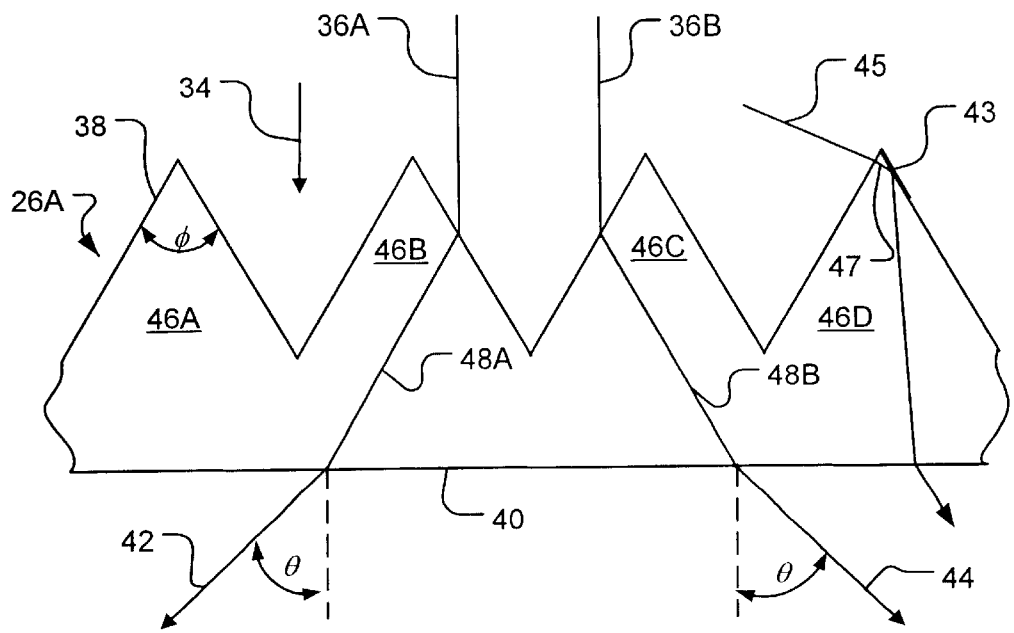
FIGS. 4A and 4B are schematic cross-sectional illustrations, on a greatly enlarged scale, of segments of embodiments of the light deflecting/recombining transmitter portion of the FIGS. 3A and 3B apparatus having refractive (FIG. 4A) and TIR (FIG. 4B) operating modes.
Figure 4B:
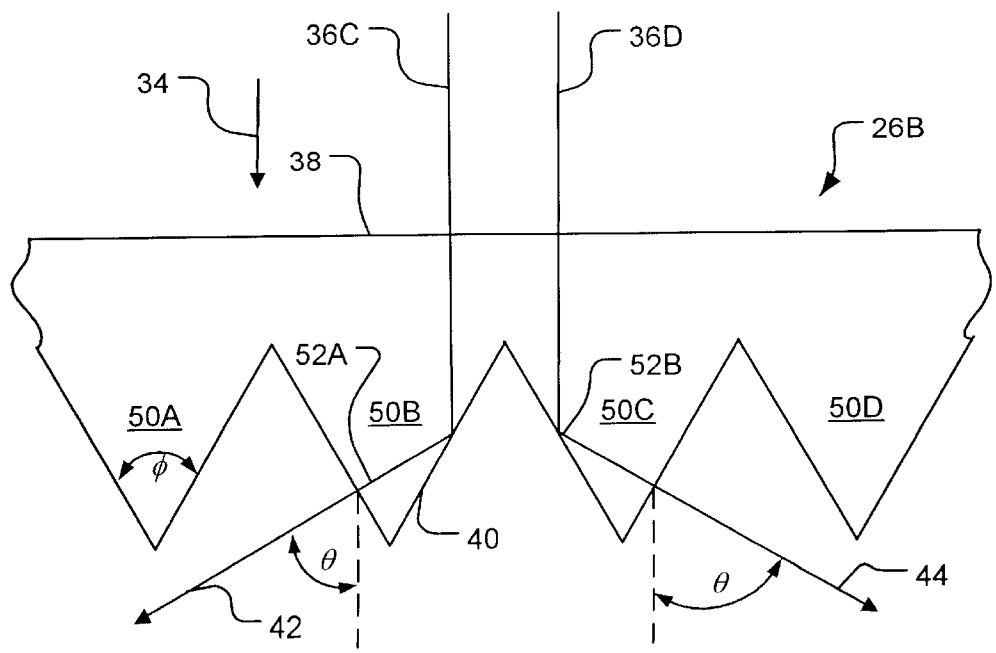

As shown in FIGS. 4A and 4B, light deflecting/recombining transmitter sheet 26 may have either a refractive or a TIR operational mode. FIG. 4A depicts refractive mode light deflecting transmitter 26A configured as a planar microstructured sheet on which a large plurality of parallel, longitudinally extending isosceles prisms 46A–46D are formed, with the prisms' apices facing outwardly opposite to direction 34 (i.e. facing toward viewer 32). Approximately perpendicularly incident light ray 36A is refracted as ray 48A at the rightward facet of prism 46B. Refracted ray 48A is again refracted at and is transmitted through inward surface 40 (i.e. "deflected") as ray 42 at an angle θ of about 30° to 60° relative to the Z axis and viewing direction 34. Approximately perpendicularly incident light ray 36B is refracted as ray 48B at the leftward facet of prism 46C. Refracted ray 48B is again refracted at and is transmitted through inward surface 40 (i.e. "deflected") as ray 44 at the same angle θ of about 30° to 60° as ray 42, but on the opposite side a notional vector normal to inward surface 40.

FIG. 4B depicts TIR mode light deflecting/recombining transmitter 26B configured as a planar microstructured sheet on which a large plurality of parallel, longitudinally extending isosceles prisms 50A–50D are formed, with the prisms' apices facing inwardly in direction 34 (i.e. facing away from viewer 32). Approximately perpendicularly incident light ray 36C passes through light deflecting/recombining transmitter 26B's outward surface 38, undergoes TIR at the rightward facet of prism 50B and is reflected as ray 52A perpendicularly to the leftward facet of prism 50B, through which ray 52A is transmitted (i.e. "deflected") as ray 42 at an angle θ of about 30° to 60° relative to the Z axis and viewing direction 34. Approximately perpendicularly incident light ray 36D passes through light deflecting/recombining transmitter 26B's outward surface 38, undergoes TIR at the leftward facet of prism 50C and is reflected as ray 52B approximately perpendicularly to the rightward facet of prism 50C, through which ray 52B is transmitted (i.e. "deflected") as ray 44 at the same angle θ of about 30° to 60° as ray 42, but on the opposite side a notional vector normal to inward surface 40.

As seen in FIGS. 6A and 6C, the prisms on light deflecting/recombining transmitter 26A extend substantially parallel to the X axis. That is, light deflecting/recombining transmitter 26A is longitudinally symmetrical with respect to the X axis. X and Z vector components inverter 30's outward prisms 22 extend substantially parallel to the prisms on light deflecting/recombining transmitter 26A and substantially parallel to the X axis. As explained in the '365 patent, X and Z vector components inverter 30's outward prisms 22 assist in maintaining the degree of deflection which was imparted by light deflecting/recombining transmitter 26; and, the inward prisms 24, which extend substantially parallel to the Y axis, perform a light reflecting function. The light deflection-maintaining portion of X and Z vector component inverter 30 is thus longitudinally symmetrical with respect to the X axis; and, the light reflecting portion of X and Z vector components inverter 30 is longitudinally symmetrical with respect to the Y axis.

FIG. 4A depicts the theoretically ideal operation of refractive mode light deflecting/recombining transmitter 26A in which light rays are incident on the light deflecting/recombining transmitter at an angle $\alpha=0°$ with respect to the Z axis. If the sheet material's refractive index $\eta \approx 1.73$ and if the prisms' included angle $\phi \approx 60°$, then light ray 36A which is parallel to the macroscopic surface normal of the sheet (in this case the Z direction) will encounter and be refracted by the right-ward facet of prism 46B, such that it is precisely parallel to and thus does not encounter prism 46B's leftward facet. Similarly, light ray 36B which is parallel to the macroscopic surface normal of the sheet (in this case the Z direction) will encounter and be refracted by the leftward facet of prism 46C, such that it is precisely parallel to and thus does not encounter prism 46C's rightward facet. This geometry facilitates efficient recombination of light rays which return (as described below) from Y vector component inverter 28 and electrophoretically switchable X and Z vector components inverter 30 through light deflecting/recombining transmitter 26A. Specifically, incident ray 36A is returned (as described below) by refraction at inward surface 40 along a path parallel to the prisms' leftward facets and thus encounters a rightward facet of one of the prisms (not necessarily prism 46B) without encountering a leftward facet. Similarly, incident ray 36B is returned by refraction at inward surface 40 along a path parallel to the prisms' rightward facets and thus encounters a leftward facet of one of the prisms (not necessarily prism 46C) without encountering a rightward facet. In this theoretically ideal ($\eta \approx 1.73$, $\phi \approx 60°$, $\alpha=0°$) operation, all light rays which are parallel to the Z axis and incident on a rightward facet of one of prisms 46A–46D are, after encountering X and Z vector components inverting reflector 30 and Y vector component inverting transmitter 28, transmitted toward viewer 32 through one of those prisms' rightward facets and parallel to the Z axis; and, all light rays which are parallel to the Z axis and incident on a leftward facet of one of prisms 46A–46D are, after encountering X and Z vector components inverting reflector 30 and Y vector component inverting transmitter 28, transmitted toward viewer 32 through one of those prisms' leftward facets and parallel to the Z axis, with negligible loss of light rays.

$\eta \approx 1.73$ sheet material bearing $\phi \approx 60°$ included angle prisms is not presently commercially available. However, $\eta \approx 1.59$ sheet material bearing $\phi \approx 70°$ included angle prisms is commercially available from 3M, St. Paul, Minn. under the trademark/trade name 2370™ and can be used as a light deflecting/recombining transmitter having a loss characteristic in which an acceptably small fraction of approximately perpendicularly incident light rays are not approximately perpendicularly transmitted toward viewer 32. Conversely, an acceptably small fraction of non-perpendicularly incident light rays are perpendicularly transmitted toward viewer 32. The latter factor can be exploited to improve daylight visibility. For example, prior art retro-reflective displays such as highway signs have relatively good, high-brightness night time visibility because the night time light source (vehicle headlights) is located near to the viewer (the vehicle driver), so a substantial portion of the headlights' incident light is retro-reflected to the driver. Such signs, which function as reflective image displays, have poorer daylight visibility because the daylight source (the sky) transmits incident light at a significant angle relative to the viewer. By appropriately selecting the refractive index of the sheet material and the prisms' included angle, one may configure a light deflecting/recombining transmitter in such a sign or other display to approximately perpendicularly transmit toward the viewer a small but significant fraction of non-perpendicularly incident sunlight rays, thus enhancing daylight visibility.

Other techniques can be used to improve daylight visibility by approximately perpendicularly transmitting toward the viewer non-perpendicularly incident sunlight rays. For example, a metallic reflective material such as aluminum can be applied along a thin longitudinal strip at the apex of each prism, on the facet away from the daylight source. This is shown in FIG. 4A (only for prism 46D), which depicts reflective strip 43 on the tip of the rightward facet of prism 46D, it being assumed that the daylight source is located to the left of the structure as viewed in FIG. 4A. Non-perpendicularly incident ray 45 is refracted as ray 47 at the leftward facet of prism 46D. Refracted ray 47 is reflected by strip 43 toward and refracted through inward surface 40. Such reflective strips can be applied to substantially all of the prisms using directional coating techniques, with the prismatic sheet material oriented with respect to the coating source such that each micro-prism shadows all but the desired reflective strip portion of the adjacent prism, to prevent coating of the shadowed portion.

Embodiments of light deflecting/recombining transmitter 26A, 26B which approximately perpendicularly transmit toward the viewer non-perpendicularly incident light rays necessarily reduce the fraction of approximately perpendicularly incident light rays which are approximately perpendicularly retro-reflected toward the viewer. However, it is possible to maintain acceptable retro-reflective brightness while enhancing daylight visibility by configuring the light deflecting/recombining transmitter so that only a small fraction of non-perpendicularly incident light rays are directed approximately perpendicularly toward the viewer.

TIR mode light deflecting/recombining transmitter 26B's prisms 50A–50D are ideally angle $\phi \approx 60°$ included angle isosceles micro-prisms. The refractive index of the sheet material used to form TIR mode light deflecting/recombining transmitter 26B is not crucial, provided it is sufficiently high that the critical angle required for TIR is achieved at the prisms' facets. Polycarbonate ($\eta \approx 1.59$) sheet material can be used. If prisms 50A–50D are $\phi \approx 60°$ included angle prisms, light rays which undergo TIR at one prism facet encounter that prism's opposing facet substantially perpendicularly, minimizing partial reflections. For included angles other than $\phi \approx 60°$, some partial reflection occurs, somewhat reducing the efficiency of TIR mode light deflecting/recombining transmitter 26B.

Y vector component inverter 28, which can be formed of a sheet material such as polycarbonate ($\eta \approx 1.59$), is positioned between light deflecting/recombining transmitter 26 and electrophoretically switchable X and Z vector components inverter 30. Together with light deflecting/recombining transmitter 26, Y vector component inverter 28 inverts the direction of light rays with respect to the Y axis (FIGS. 3B and 6A). This achieves the desired full retro-reflection of incident light rays, since X and Z vector components inverter 30 directionally inverts rays with respect to the X and Z axes.

Figure 5A:
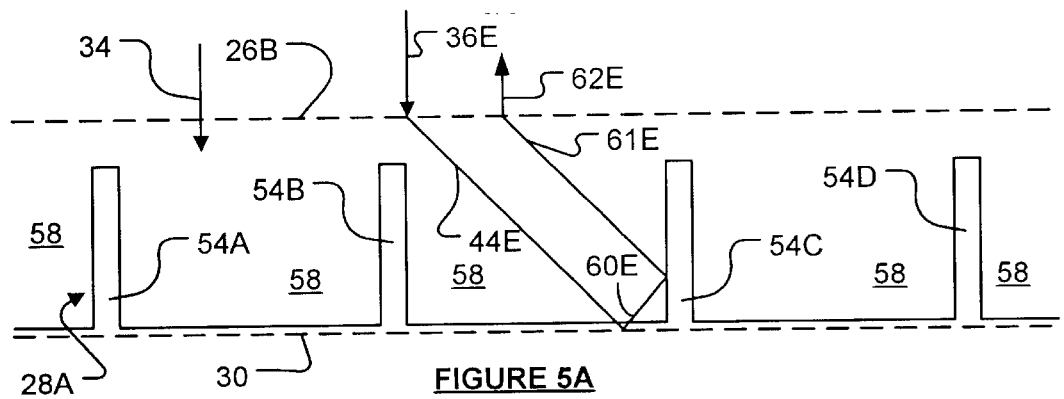
FIGS. 5A and 5B are cross-sectional illustrations, on a greatly enlarged scale, of segments of ribbed (FIG. 5A) and channeled (FIG. 5B) embodiments of the Y vector component inverting transmitter portion of the FIGS. 3A and 3B apparatus.
Figure 5B:
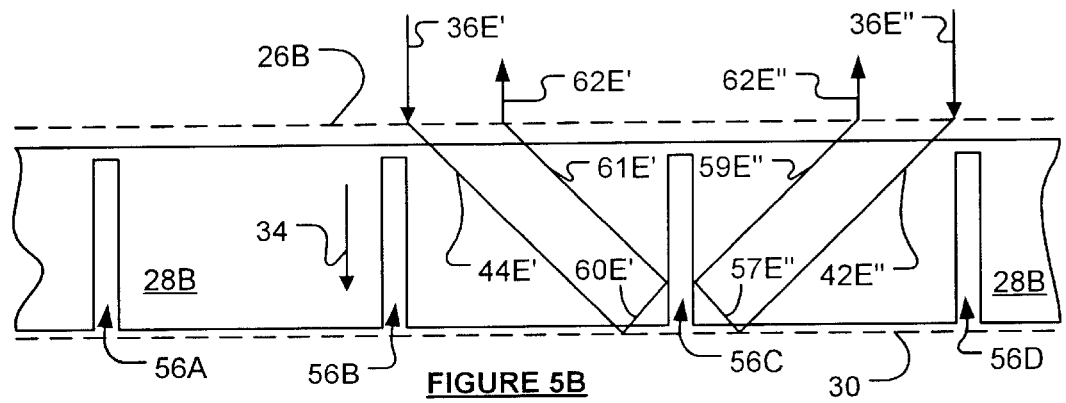

Y vector component inverting transmitter sheet 28 may be configured as a planar microstructured sheet 28A bearing a plurality of "reflector element" ribs 54 as shown in FIGS. 5A and 6C; or, as a planar microstructured sheet 28B having a plurality of longitudinally extending "reflector element" channels 56 formed therein as shown in FIGS. 5B, 6A and 6B. In ribbed inverter 28A, each rib 54 may be a metallic mirror projecting perpendicularly outwardly, parallel to viewing direction 34 (i.e. parallel to the Z axis) and perpendicular to the X and Y axes, with an air gap 58 separating each adjacent pair of ribs 54. In channeled inverter 28B, each channel 56 may be an air gap formed in the sheet material, with the channels' depth (i.e. height dimension H) oriented parallel to viewing direction 34 (i.e. parallel to the Z axis) and perpendicular to the X and Y axes. In FIGS. 5A–5D, light deflecting/recombining transmitter 26B and X and Z vector components inverter 30 are shown only as dashed lines.

As seen in FIG. 5A, incident ray 36E is transmitted toward Y vector component inverter 28A by light deflecting/recombining transmitter 26B as ray 44E, as previously explained. If ray 44E passes directly from light deflecting/recombining transmitter 26B to X and Z vector components inverter 30 without encountering one of ribs 54 (as shown in FIG. 5A) then ray 44E is directionally inverted with respect to the X and Z axes by X and Z vector components inverter 30 as ray 60E. Reflected ray 60E is reflected toward light deflecting/recombining transmitter 26B by rib 54C as ray 61E. Ray 61E travels in the opposite direction to, but is otherwise identical to ray 44E. That is, ray 44E is directionally inverted with respect to the Y axis as ray 61E which has the same angle θ of about 30° to 60° relative to the Z axis and viewing direction 34 as did ray 44E. Ray 61E is thus "recombined" for full retro-reflection from light deflecting/recombining transmitter 26B. Specifically, ray 61E passes through the rightward facet of one of light deflecting/recombining transmitter 26B's prisms 50, undergoes TIR at that prism's leftward facet and is accordingly reflected toward and passes approximately perpendicularly through light deflecting/recombining transmitter 26B's outward surface 38 as ray 62E. Ray 62E is parallel to ray 36E but travels in the opposite direction thereto. That is, ray 36E is fully retro-reflected with respect to the X, Y and Z axes as ray 62E.

Figure 5C:
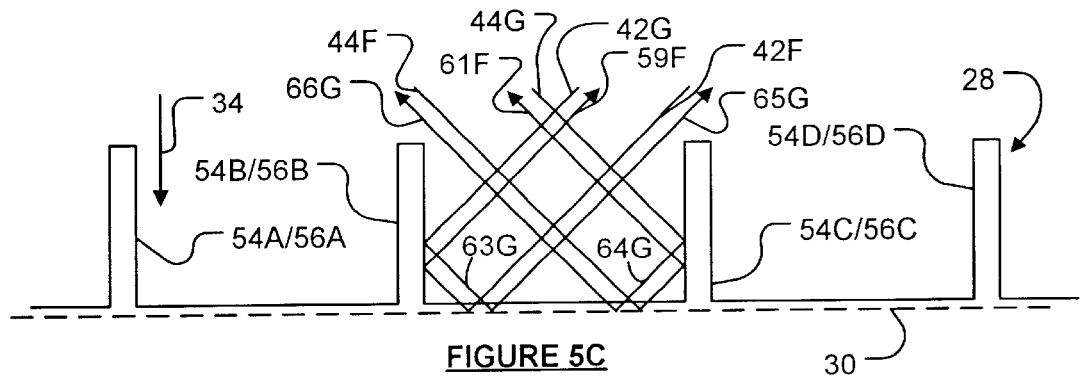
FIG. 5C depicts operation of the FIGS. 5A and 5B Y vector component inverters with respect to (i) light rays which pass from the light deflecting/recombining transmitter portion of the FIGS. 3A and 3B apparatus to the X and Z vector components inverter portion thereof without first encountering a reflector rib/channel; and, (ii) light rays which pass from the light deflecting/recombining transmitter to a reflector rib/channel before passing to the X and Z vector component inverter.
Figure 5D:
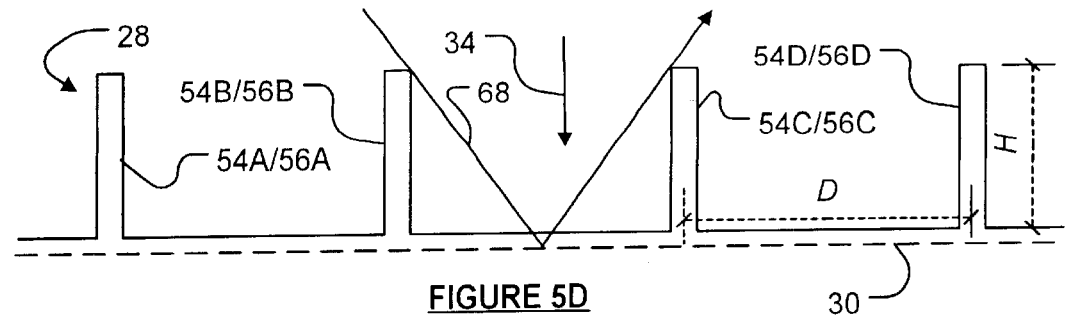
FIG. 5D depicts the aspect ratio dependent light deflection characteristic of the FIGS. 5A and 5B Y vector component inverters.

Comparison of FIGS. 5A and 5B reveals that channeled Y vector component inverter 28B is optically equivalent to ribbed Y vector component inverter 28A. As seen in FIG. 5B, incident ray 36E' is transmitted toward inverter 28B by light deflecting/recombining transmitter 26B as ray 44E', as previously explained. If ray 44E' passes directly from light deflecting/recombining transmitter 26B to X and Z vector component inverter 30 without encountering one of channels 56 (as shown in FIG. 5B) then ray 44E' is directionally inverted with respect to the X and Z axes by X and Z vector components inverter 30 as ray 60E'. Reflected ray 60E' undergoes TIR at the sheet material:air interface on the left side of channel 56C and is reflected toward light deflecting/recombining transmitter 26B as ray 61E'. Ray 61E' travels in the opposite direction to, but is otherwise identical to ray 44E'. That is, ray 44E' is directionally inverted with respect to the Y axis as ray 61E' which has the same angle θ of about 30° to 60° relative to the Z axis and viewing direction 34 as did ray 44E'. Ray 61E' is thus "recombined" for full retro-reflection from light deflecting/recombining transmitter 26B. Specifically, ray 61E' passes through the rightward facet of one of light deflecting/recombining transmitter 26B's prisms 50, undergoes TIR at that prism's leftward facet and is accordingly reflected toward and passes approximately perpendicularly through light deflecting/recombining transmitter 26B's outward surface 38 as ray 62E'. Ray 62E' is parallel to ray 36E' but travels in the opposite direction thereto. That is, ray 36E' is fully retro-reflected with respect to the X, Y and Z axes as ray 62E'. Given the above-described optical equivalence of ribbed and channeled Y vector component inverters 28A, 28B; FIGS. 5C and 5D schematically depict a Y vector component inverter 28 which may be either ribbed or channeled.

FIGS. 5B and 6B reveal the optical symmetry of channeled Y vector component inverter 28B with respect to the left/right sides of channels 56. For example, incident ray 36E" is transmitted toward inverter 28B by light deflecting/recombining transmitter 26B as ray 42E", as previously explained. Ray 42E" passes directly from light deflecting/recombining transmitter 26B to X and Z vector components inverter 30 without encountering one of ribs 54 and is directionally inverted with respect to the X and Z axes by X and Z vector components inverter 30 as ray 57E". Reflected ray 57E" undergoes TIR at the sheet material:air interface on the right side of channel 56C and is then reflected toward light deflecting/recombining transmitter 26B as ray 59E". Ray 59E" travels in the opposite direction to, but is otherwise identical to ray 42E". That is, ray 42E" is directionally inverted with respect to the Y axis as ray 59E" which has the same angle θ of about 30° to 60° relative to the Z axis and viewing direction 34 as did ray 42E". Ray 59E" is thus "recombined" for full retro-reflection from light deflecting/recombining transmitter 26B. Specifically, ray 59E" passes through the leftward facet of one of light deflecting/recombining transmitter 26B's prisms 50, undergoes TIR at that prism's leftward facet and is accordingly reflected toward and passes approximately perpendicularly through light deflecting/recombining transmitter 26B's outward surface 38 as ray 62E". Ray 62E" is parallel to ray 36E" but travels in the opposite direction thereto. That is, ray 36E" is fully retro-reflected with respect to the X, Y and Z axes as ray 62E". As previously explained, ribbed Y vector component inverter 28A is optically equivalent to channeled Y vector component inverter 28B. It will thus be understood that ribbed Y vector component inverter 28A is optically symmetrical with respect to the left/right sides of ribs 54.

In FIG. 5C, rays 42F, 44F (also seen in FIG. 6B) pass directly from light deflecting/recombining transmitter 26 to electrophoretically switchable X and Z vector components inverter 30 without first encountering one of ribs 54 (or channels 56). Rays 42F, 44F are thus equivalent to rays 42E", 44E' respectively described above in relation to FIGS. 5A, 5B and need not be further described except to observe that they are respectively reflected by Y vector component inverter 28 as rays 59F, 61F.

Rays 42G, 44G (also seen in FIG. 6B) however pass from light deflecting/recombining transmitter 26 to one of ribs 54 (or channels 56) before passing to electrophoretically switchable X and Z vector components inverter 30. Rays 42G, 44G are reflected toward X and Z vector components inverter 30 by one of ribs 54 (or channels 56) as rays 63G, 64G respectively. Rays 63G, 64G are directionally inverted with respect to the X and Z axes by X and Z vector components inverter 30 as rays 65G, 66G respectively. Rays 65G, 66G travel in the opposite direction to, but are otherwise identical to rays 42G, 44G respectively. That is, rays 42G, 44G are directionally inverted with respect to the Y axis as rays 65G, 66G which have the same angle θ of about ±30° to ±60° relative to the Z axis and viewing direction 34 as did rays 42G, 44G respectively. Rays 65G, 66G are thus "recombined" for full retro-reflection from light deflecting/recombining transmitter 26B. Specifically, rays 65G, 66G respectively pass through leftward or rightward facets of light deflecting/recombining transmitter 26B's prisms 50, undergo TIR at those facets and are accordingly reflected toward and pass approximately perpendicularly through light deflecting/recombining transmitter 26B's outward surface 38. The original incident rays corresponding to rays 42G, 44G are thus fully retro-reflected with respect to the X, Y and Z axes.

As FIG. 5D shows, the aspect ratio of ribs 54 or channels 56 (i.e. the ratio of their height H to the separation distance D between any adjacent pair of ribs 54 or channels 56) is selected to minimize the number of light rays (such as ray 68) which can pass directly from light deflecting/recombining transmitter 26 to X and Z vector components inverter 30, undergo directional inversion with respect to the X and Z axes, and return to light deflecting/recombining transmitter 26 without exactly one encounter with one of ribs 54 or channels 56. Rays which do not encounter one of ribs 54 or channels 56 an odd number of times (preferably, exactly once) are not directionally inverted with respect to the Y axis and are therefore not fully retro-reflected.

Figure 3A:
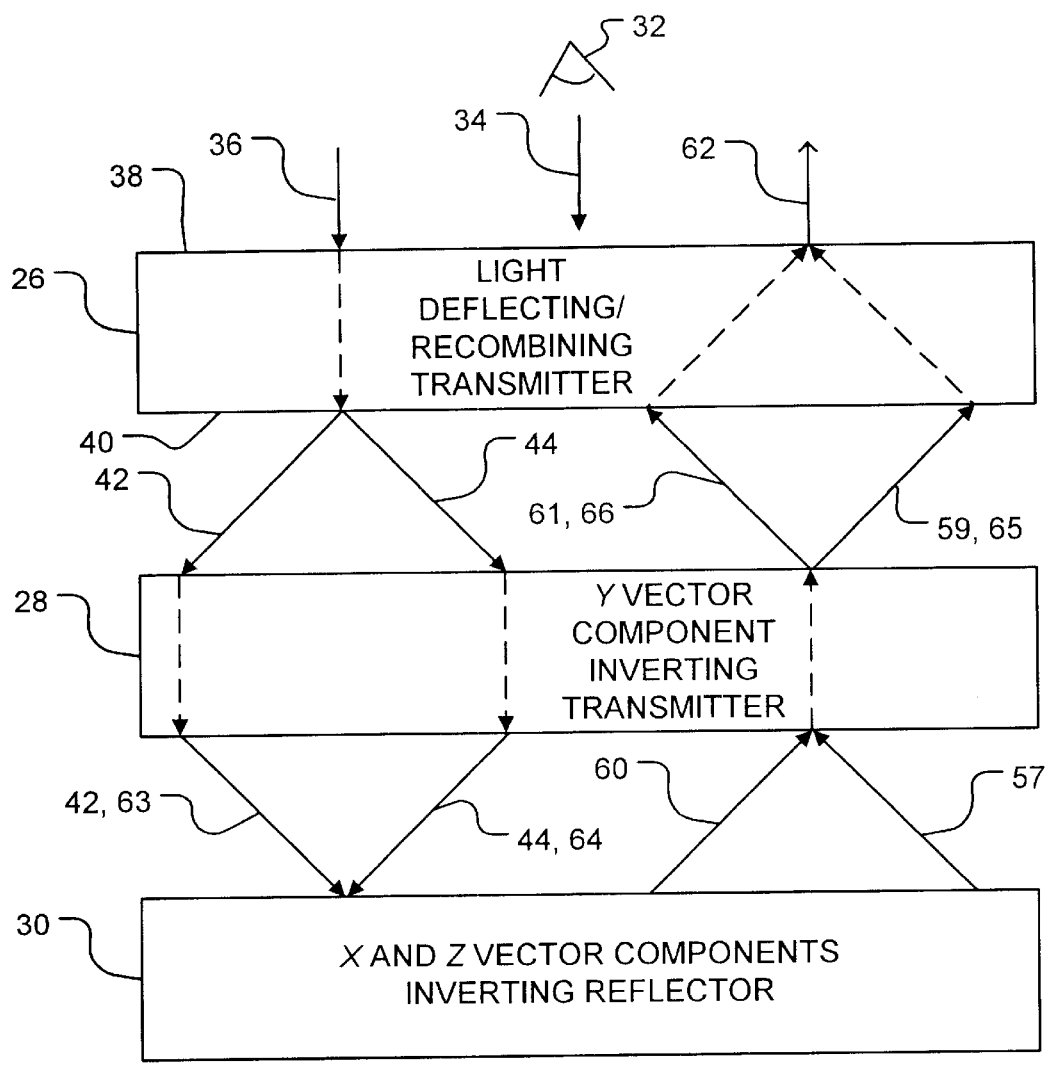
FIGS. 3A and 3B are schematic cross-sectional and isometric illustrations, on a greatly enlarged scale, of an electrophoretically switchable fully retro-reflective display in accordance with this invention.
Figure 3B:
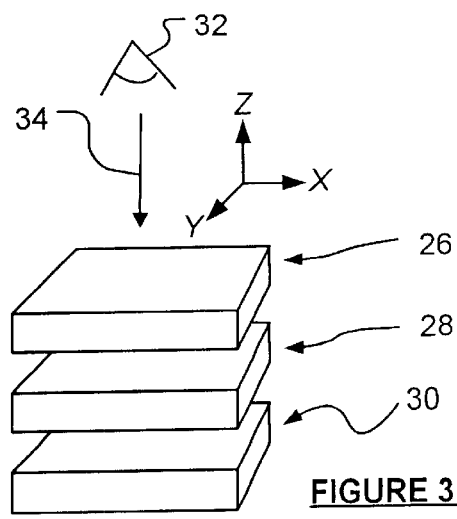

In summary, as FIG. 3A shows, approximately perpendicularly incident light rays 36 (i.e. light rays which are incident on light deflecting/recombining transmitter 26 at an angle $\alpha<25°$ with respect to the Z axis), are reflectively or refractively transmitted through light deflecting/recombining transmitter 26 toward Y vector component inverter 28 as deflected rays 42, 44. Some of rays 42, 44 pass through Y vector component inverter 28 to X and Z vector components inverter 30 without first encountering one of ribs 54 or channels 56. Such rays are directionally inverted with respect to the X and Z axes by X and Z vector components inverter 30 as rays 57, 60. Rays 57, 60 are then reflected exactly once with respect to the Y axis by one of ribs 54 or channels 56 and pass as recombined rays 59, 61 toward light deflecting/recombining transmitter 26 which reflects or refracts them so that they are transmitted, as rays 62, at substantially the same angle a as the original incident rays 36 but travel in the opposite direction. Those rays 42, 44 which encounter one of ribs 54 or channels 56 are reflected as rays 63, 64 toward X and Z vector components inverter 30 which directionally inverts their vector components with respect to the X and Z axes as recombined rays 65, 66. Rays 65, 66 pass through Y vector component inverter 28 to X and Z vector component inverter 30 without again encountering one of ribs 54 or channels 56. Light deflecting/recombining transmitter 26 reflects or refracts rays 65, 66 so that they too are transmitted, as rays 62, at substantially the same angle a as the original incident rays 36 but travel in the opposite direction. Incident rays 36 are thus fully retro-reflected with respect to the X, Y and Z axes as rays 62.

By efficiently deflecting light rays toward Y vector component inverter 28, constraining them to exactly one reflective encounter with Y vector component inverter 28 and X and Z vector components inverter 30, then recombining the reflected rays, the invention efficiently maximizes full retro-reflection of light rays with high angular accuracy over a useful angular range. High resolution displays can be constructed by fabricating light deflecting/recombining transmitter 26, Y vector component inverter 28 and electrophoretically switchable X and Z vector components inverter 30 as planar optical microstructured sheets. Such displays require relatively little power, and are thus amenable to solar or small portable battery powered operation.

As will be apparent to those skilled in the art in the light of the foregoing disclosure, many alterations and modifications are possible in the practice of this invention without departing from the spirit or scope thereof. For example, although X and Z vector components inverting reflector sheet 30 preferably has longitudinal symmetry with respect to the X axis, X and Z vector components inverting reflector sheet 30 need only have longitudinal symmetry with respect to the Y axis if sheet 30 is formed of a sufficiently high refractive index material. Accordingly, the scope of the invention is to be construed in accordance with the substance defined by the following claims.

What is claimed is:

1. A variable image display for retro-reflecting light with respect to mutually perpendicular X, Y and Z axes, said display having a preferred viewing direction parallel to said Z axis, said display comprising:
    (a) a substantially macroscopically planar light deflecting/recombining transmitter sheet longitudinally symmetrical with respect to said X axis;
    (b) a substantially macroscopically planar X and Z vector components inverting reflector sheet substantially parallel to said light deflecting/recombining transmitter sheet, said X and Z vector components inverting reflector sheet having longitudinal symmetry with respect to said Y axis;
    (c) a substantially macroscopically planar Y vector component inverting transmitter sheet longitudinally symmetrical with respect to said X axis, said Y vector component inverting transmitter sheet substantially parallel to and positioned between said light deflecting/recombining transmitter sheet and said X and Z vector components inverting reflector sheet, said Y vector component inverting transmitter sheet further comprising a plurality of reflector elements, each one of said reflector elements having a surface normal substantially parallel to said Y axis, each one of said reflector elements having a height H, each adjacent pair of said reflector elements spaced apart by a separation distance D;

wherein:
    (i) each one of said sheets has a macroscopic surface normal substantially parallel to said Z axis;
    (ii) light rays incident on said light deflecting/recombining transmitter sheet at an angle $\alpha<25°$ with respect to said Z axis are transmitted by said light deflecting/recombining transmitter sheet toward said Y vector component inverting transmitter sheet and said X and Z vector components inverting reflector sheet at an angle $\theta$ with respect to said Z axis;
    (iii) said light rays transmitted by said light deflecting/recombining transmitter sheet are reflected by said X and Z vector components inverting reflector sheet toward said Y vector component inverting transmitter sheet and said light deflecting/recombining transmitter sheet at said angle $\theta$ with respect to said Z axis;
    (iv) vector components of substantially all of said light rays reflected by said X and Z vector components inverting reflector sheet are directionally inverted by said X and Z vector components inverting reflector sheet with respect to said X and Z axes; and,
    (v) vector components of substantially all of said light rays transmitted by said light deflecting/recombining transmitter sheet and reflected by said X and Z vector components inverting reflector sheet are directionally inverted with respect to said Y axis by only one reflection at one of said reflector elements, return to said light deflecting/recombining transmitter sheet at said angle θ with respect to said Z axis, and are transmitted by said light deflecting/recombining transmitter sheet toward said viewer substantially 180° opposed to said incident light rays and at said angle α with respect to said Z axis.

2. An image display as defined in claim 1, wherein said angle θ is within the range of about 30° to 60°.

3. An image display as defined in claim 1, wherein said X and Z vector components inverting reflector sheet further comprises a light deflection-maintaining portion longitudinally symmetrical with respect to said X axis, and a light reflecting portion longitudinally symmetrical with respect to said Y axis.

4. An image display as defined in claim 1, wherein said reflector elements have an H:D aspect ratio selected to maximize the number of said light rays transmitted by said light deflecting/recombining transmitter sheet and reflected by said X and Z vector components inverting reflector sheet which undergo said only one reflection at said one of said reflector elements.

5. An image display as defined in claim 4, wherein said light deflecting/recombining transmitter sheet further comprises a first plurality of prisms extending parallel to said X axis.

6. An image display as defined in claim 5, wherein said first plurality prisms are on an outward face of said light deflecting/recombining transmitter sheet.

7. An image display as defined in claim 5, wherein said first plurality prisms are on an inward face of said light deflecting/recombining transmitter sheet.

8. An image display as defined in claim 6, wherein said first plurality prisms are 60° included angle isosceles prisms.

9. An image display as defined in claim 7, wherein said first plurality prisms are 60° included angle isosceles prisms.

10. An image display as defined in claim 8, wherein said first plurality prisms are microstructures formed of a composite polymer sheet material having a refractive index of about 1.73.

11. An image display as defined in claim 9, wherein said first plurality prisms are microstructures formed of a composite polymer sheet material having a refractive index greater than or equal to about 1.59.

12. An image display as defined in claim 6, wherein said first plurality prisms are 70° included angle isosceles prisms.

13. An image display as defined in claim 7, wherein said first plurality prisms are 70° included angle isosceles prisms.

14. An image display as defined in claim 12, wherein said first plurality prisms are microstructures formed of a composite polymer sheet material having a refractive index of about 1.59.

15. An image display as defined in claim 13, wherein said first plurality prisms are microstructures formed of a composite polymer sheet material having a refractive index of about 1.59.

16. An image display as defined in claim 5, wherein said first plurality prisms are isosceles prisms with apices subtending an angle φ which varies as a function of the refractive index of said light deflecting/recombining transmitter sheet.

17. An image display as defined in claim 5, wherein said X and Z vector components inverting reflector sheet light deflecting portion further comprises a second plurality of prisms extending parallel to said X axis, and said X and Z vector components inverting reflector sheet light reflecting portion further comprises a third plurality of prisms extending parallel to said Y axis.

18. An image display as defined in claim 17, wherein said second plurality prisms are microstructures formed on an outward face of said X and Z vector components inverting reflector sheet and said third plurality prisms are microstructures formed on an inward face of said X and Z vector components inverting reflector sheet.

19. An image display as defined in claim 18, wherein said second and third plurality prisms are right angle isosceles prisms.

20. An image display as defined in claim 4, wherein said reflector elements are microstructure ribs extending parallel to said X axis.

21. An image display as defined in claim 4, wherein said reflector elements are microstructure channels extending parallel to said X axis.

22. An image display as defined in claim 6, further comprising a reflective material extending along a thin longitudinal strip at an apex of and on one facet of substantially each one of said first plurality prisms.

* * * * *